US011221436B2

(12) United States Patent
Starkovich et al.

(10) Patent No.: US 11,221,436 B2
(45) Date of Patent: Jan. 11, 2022

(54) FUNCTIONALIZED GRAPHENE AND CNT SHEET OPTICAL ABSORBERS AND METHOD OF MANUFACTURE

(71) Applicant: Northrop Grumman Systems Corporation, Falls Church, VA (US)

(72) Inventors: John A. Starkovich, Redondo Beach, CA (US); Kevin J. Salvini, Lawndale, CA (US); Edward M. Silverman, Encino, CA (US)

(73) Assignee: NORTHROP GRUMMAN SYSTEMS CORPORATION, Falls Church, VA (US)

( * ) Notice: Subject to any disclaimer, the term of this patent is extended or adjusted under 35 U.S.C. 154(b) by 0 days.

(21) Appl. No.: 17/354,124

(22) Filed: Jun. 22, 2021

(65) Prior Publication Data

US 2021/0373206 A1  Dec. 2, 2021

Related U.S. Application Data

(62) Division of application No. 15/946,937, filed on Apr. 6, 2018, now Pat. No. 11,092,722.

(51) Int. Cl.
| | | |
|---|---|---|
| B32B 9/00 | (2006.01) | |
| G02B 5/00 | (2006.01) | |
| G02B 1/04 | (2006.01) | |
| G02B 1/12 | (2006.01) | |
| C01B 32/168 | (2017.01) | |
| C01B 32/174 | (2017.01) | |
| B82Y 40/00 | (2011.01) | |
| B82Y 20/00 | (2011.01) | |
| B82Y 30/00 | (2011.01) | |

(52) U.S. Cl.
CPC ............ *G02B 5/003* (2013.01); *C01B 32/168* (2017.08); *C01B 32/174* (2017.08); *G02B 1/04* (2013.01); *G02B 1/12* (2013.01); *B82Y 20/00* (2013.01); *B82Y 30/00* (2013.01); *B82Y 40/00* (2013.01); *Y10T 428/30* (2015.01)

(58) Field of Classification Search
CPC ....... Y10T 428/30; B32B 9/007; B82Y 30/00; Y10S 977/742; C01B 2202/00
USPC .......................................... 428/408; 423/448
See application file for complete search history.

*Primary Examiner* — Daniel H Miller
(74) *Attorney, Agent, or Firm* — McCracken & Gillen LLC (57) ABSTRACT

An optical absorber and method of manufacture is disclosed. A non-woven sheet of randomly-organized horizontally-oriented carbon nanotubes (CNTs) is subjected to a laser rasterizing treatment at ambient temperature and pressure. The upper surface of the sheet is functionalized by oxygen and hydrogen atoms resulting in improved absorbance properties as compared to untreated CNT sheets as well as to commercial state-of-art black paints. Laser treatment conditions may also be altered or modulated to provide surface texturing in addition to functionalization to enhance light trapping and optical absorbance properties.

12 Claims, 8 Drawing Sheets

Fig. 6A
*Spot Generator*

Fig. 6B
*Line Generator*

Fig. 7A
Randomly Texturized Surface

Fig. 7B
Variable Depth Light Trapping Cavities

Fig. 8

*Pattern Texturized Surface*

FUNCTIONALIZED GRAPHENE AND CNT SHEET OPTICAL ABSORBERS AND METHOD OF MANUFACTURE

CROSS REFERENCE TO RELATED APPLICATIONS

The present application is a divisional application of U.S. patent application Ser. No. 15/946,937, filed Apr. 6, 2018, entitled "FUNCTIONALIZED GRAPHENE AND CNT SHEET OPTICAL ABSORBERS AND METHOD OF MANUFACTURE", the entire contents of which are incorporated herein by reference.

GOVERNMENT CONTRACT

The Government of the United States of America has rights in this invention pursuant to Government Contract No. 11-C-0042 (Restricted).

BACKGROUND

The invention relates generally to optical absorbers and more particularly to an optical absorber using a non-woven carbon nanotube (CNT) film or sheet material with CNT randomly-organized in a planar horizontal manner and a method for its manufacture.

The need to minimize stray or interfering light in optical devices is well understood. Typically, devices sensitive to stray light are coated with a substance that absorbs the light as much as possible. Current optical black absorbers have performance issues and/or mechanical properties that severely limit their use in diverse applications such as stray light reduction coatings in optical sensors, telescopes and as optical absorbers for larger scale solar energy conversion systems. Several approaches are known, including (i) polyurethane and other polymer based black paints, (ii) some anodized inorganic black coatings, (iii) sputtering and other vacuum deposition techniques as well as etching processes for producing textured light trapping surfaces, (iv) vertically aligned carbon nanotube (VACNT) arrays, and (v) plasma-treated CNT/MWCNT sheet materials.

One commercially available optical absorber is Vantablack®, a chemical vapor deposited (CVD) vertically-aligned CNT (VACNT) material, which has excellent absorbance properties but is fragile, expensive to produce and is not suited for larger areal applications. Typically VACNT arrays are produced via a batch mode vacuum chamber process that severely restricts their use for many larger scale optical instruments and solar power generation applications.

A conventional optical black coating which is widely used is Aeroglaze® Z307 (Lord Corporation, Cary, N.C.) carbon-loaded polyurethane black paint. While the Z307 coating is relatively inexpensive and easy to apply, it's absorbance properties are inferior to the VACNT material. Another type of coating subjects a randomly-oriented, non-woven CNT sheet material to a atmospheric pressure plasma treatment to reduce its reflectance properties. While the plasma-treated CNT sheet has better absorption that the Z307 coating, it requires several minute exposure times and is more expensive to prepare in large area format.

Current optical black absorbers have performance issues and/or mechanical properties that severely limit their use in diverse applications such as stray light reduction coatings in optical sensors, telescopes and as absorber materials for larger scale solar energy conversion systems. Thus, a need exists for an optical absorber that can be inexpensively produced in large area and/or non-planar formats and is useful for many different applications.

SUMMARY

The invention in one implementation encompasses an optical absorber made from non-woven, randomly-organized sheet or film material consisting of horizontally-oriented single-wall CNT (SWCNT) or multi-wall CNT (MWCNT) material or mixtures thereof that has been laser-treated to increase its absorbance properties. The invention further encompasses a method of performing the laser treatment which may alter sheet material surface chemical composition through addition of oxygenated species and may additionally etch or partially remove some CNT material creating a textured surface.

DESCRIPTION OF THE DRAWINGS

Features of example implementations of the invention will become apparent from the description, the claims, and the accompanying drawings in which:

DETAILED DESCRIPTION

Reference will now be made in detail to one or more embodiments of the invention. While the invention will be described with respect to these embodiments, it should be understood that the invention is not limited to any particular embodiment. On the contrary, the invention includes alternatives, modifications, and equivalents as may come within the spirit and scope of the appended claims. Furthermore, in the following description, numerous specific details are set forth to provide a thorough understanding of the invention. The invention may be practiced without some or all of these specific details. In other instances, well-known structures and principles of operation have not been described in detail to avoid obscuring the invention.

Figure 1A:
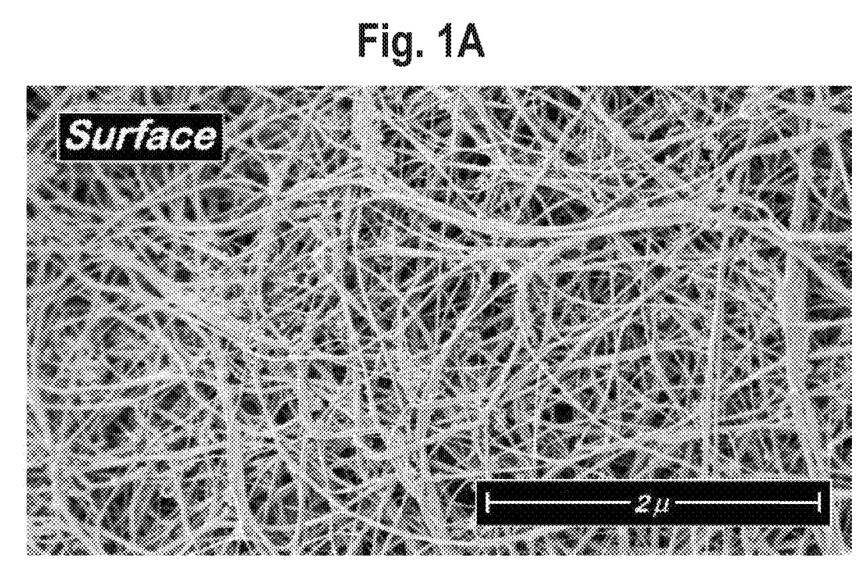
FIGS. 1A and 1B depict planar and cross-section views of a multi-walled carbon nanotube (MWCNT) sheet as-produced for use with the present invention.
Figure 1B:
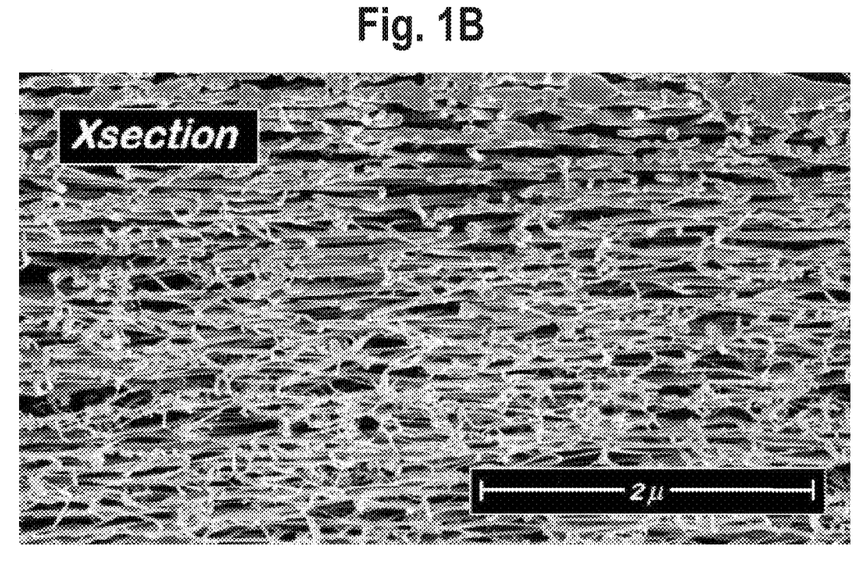

Single-wall (SWCNT) and multi-walled carbon nanotube (MWCNT) sheet materials are paper- or felt-like materials with CNTs randomly-organized in a horizontal fashion more or less parallel to the paper surface. Throughout the specification, CNT will be understood to mean either SWCNT or MWCNT or a combination of the two. These paper or sheet materials may be made in a continuous dry process by drawing CNT aerogel from a growth reactor and consolidating several thin layers in to a sheet, for example. CNT sheet materials are much less expensive than VACNT material. They may be manufactured via a continuous process and are available in product forms measuring approximately 1-2 meters wide by several hundred meters in length. The sheet or paper material may also be made via a wet filtration or evaporation process in which a liquid suspension of the CNT is drawn or deposited using filtering media or simply deposited on a substrate as film/cake material by evaporative drying. The surface and internal structure of CNT sheet materials are illustrated in FIGS. 1A and 1B respectively. FIG. 1A shows the random distribution of CNTs in a sheet. FIG. 1B shows a cross-section of sheets generally stacked to make a layer approximately 12 to 25 micrometers (0.0005 to 0.001 inch) thick although a range of 10 to 250 micrometers (0.0004 to 0.010 inch) may be provided.

In an embodiment, an automated laser beam may be swept, rastered, or vector driven to functionalize the surface of CNT sheet material to enhance its broadband absorbance properties. The laser power may be modulated and its beam geometry and degree of focus may be simultaneously altered during surface treatment. The laser beam shape may be of the circular spot, star, bar or generated line type. While the as-produced raw CNT sheet initially has much higher reflectance (lower absorbance) properties than VACNT arrays, a controlled laser surface treatment greatly reduces reflectance to levels that are significantly better than conventional optical black coatings such as Z307. The intense laser irradiation is absorbed by the CNTs at the sheet surface and to some depth of up to 2-10× the wavelength of the laser used for functionalization causing the CNTs to locally heat to over 450° C. At this temperature and in the presence of air, atmospheric moisture, carbon dioxide, nitrous oxide or mixtures thereof, CNTs are partially oxidized and unzipped (functionalized) thereby changing surface chemical composition, morphology and light trapping ability.

Figure 2:
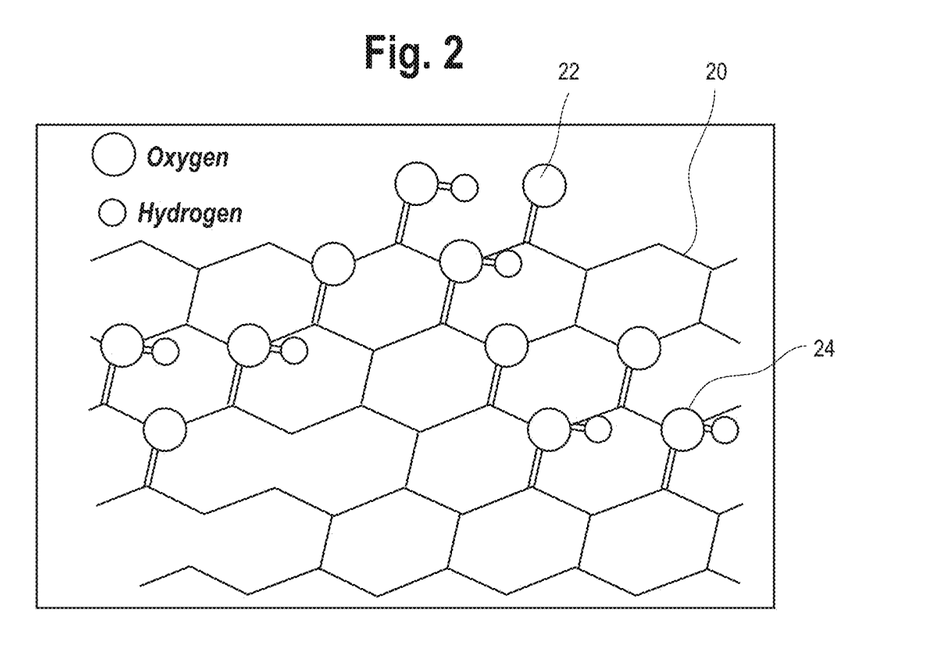
FIG. 2 depicts a representation of the MWCNT sheet of FIG. 1 after treatment according to the present invention.

This surface functionalization is illustrated in FIG. 2. As shown, oxygen atoms, represented at 22, are added to some points in a CNT lattice 20, while a combination of oxygen and hydrogen atoms, represented at 24, are added to other points in the lattice. The oxygenated surface species produced can include organic aldehyde, ketone, carboxylate, epoxide, peroxide and hydroxyl compounds. Such surface functional groups alter surface electronic energy levels/electrical conductivity and increase optical absorbance (reduce reflectance) properties.

Figure 3:
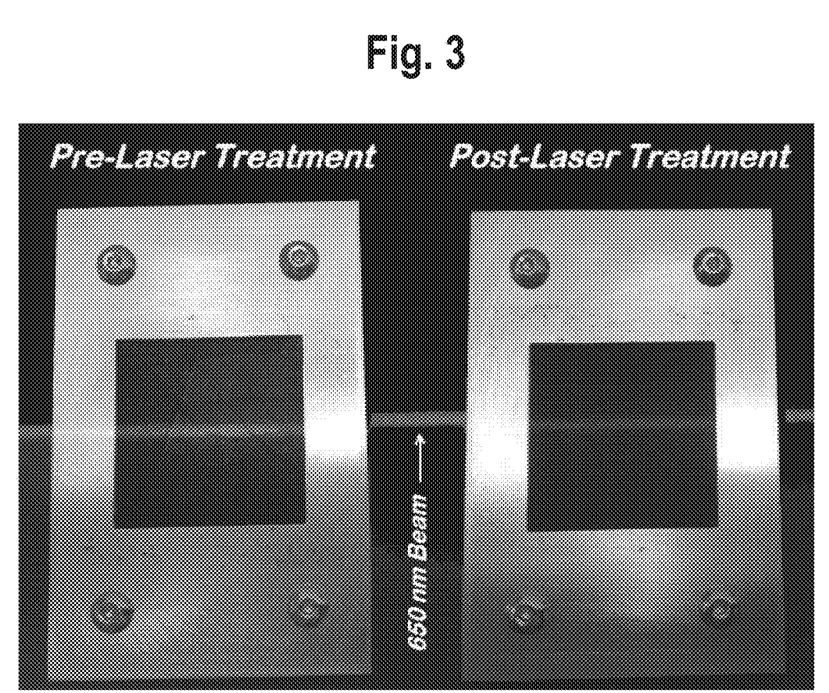
FIG. 3 depicts the difference in reflectance for an untreated MWCNT sheet and one treated according to the present invention.

A laser-treated surface-functionalized CNT sheet material offers significantly improved absorbance properties over black paints. It is also mechanically robust and may be produced much less expensively on large scale than VACNT materials. In an embodiment, the method uses a $CO_2$ laser such as one available from Epilog Laser®, for example, although any gas type or solid state laser could be used. The $CO_2$ laser is operated at ambient temperature and pressure with operational exhaust filter and air assist disabled to surface treat a CNT sheet material as described above. FIG. 3 shows two CNT sheets, each clamped between two aluminum plates, of which one has a square window removed. The sample on the left has not received the laser treatment according to the present invention. The sample on the right was rastered with a laser in a solid block pattern covering an area larger than the square window. In an embodiment, laser instrument resolution was set, for example, at 470 dots per cm (1200 dots per inch) with Stucki dithering and a rastering speed of 152 cm/sec (60 inch per sec) and power level setting of 5% (3 watts). These parameters represent one embodiment; many other setting combinations are encompassed by the method. Upon completion of the rastering process the treated coupon sample was submitted for hemispherical reflectance measurement.

The effect of rastered laser treatment on now-woven CNT sheet is visually demonstrated and compared in the photographs shown in FIG. 3 of 30 mm coupon samples taken before and after treatment with the laser. When illuminated with a 650 nm line pointer laser, for example, the beam is barely visible with the laser treated sample on the right, indicating that the reflectance properties have been reduced.

Figure 4:
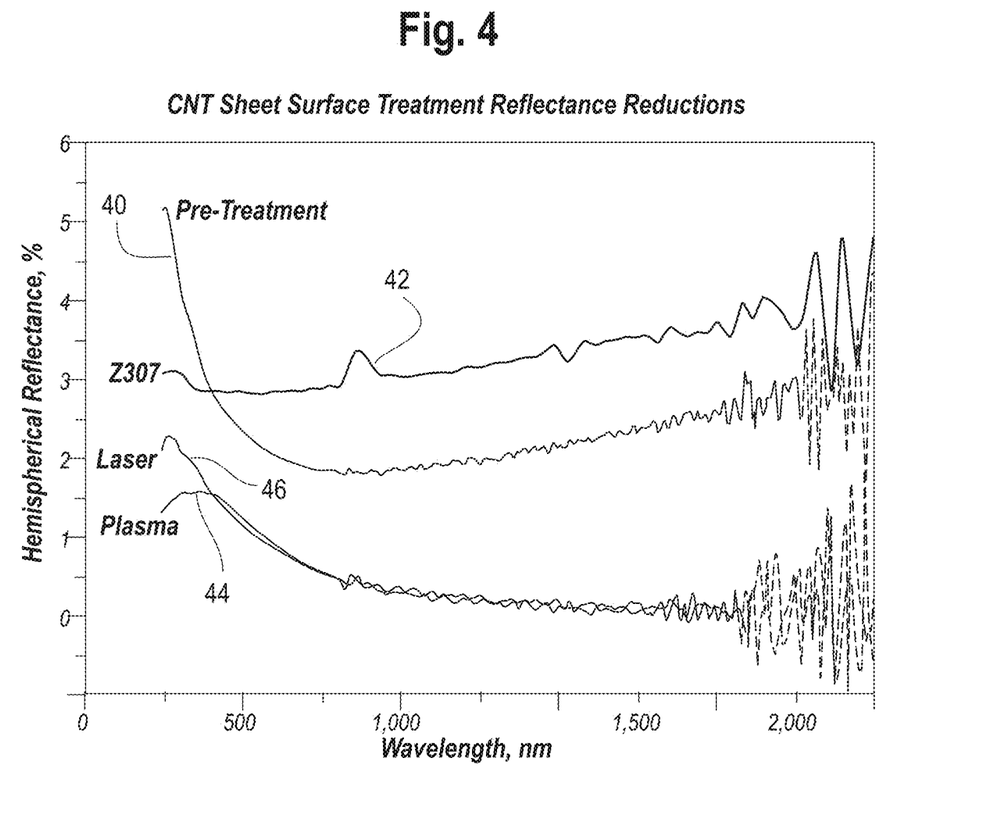
FIG. 4 is a graph showing the broadband reflectance properties of the inventive material as compared to other optical absorbing materials over a range of wavelengths.

The broadband reduction in reflectance properties affected by laser treatment are better illustrated and compared in the measured spectrophotometer results shown in FIG. 4, which depicts a graph of hemispheric reflection reductions of four different absorbing materials at a range of wavelengths, in nanometers (nm). The hemispherical reflection property of a non-woven CNT sheet which has received no further treatment is shown at 40. FIG. 4 also shows a similar graph for the Z307 coating at 42, a CNT sheet receiving plasma treatment at 44 and a CNT sheet receiving a laser treatment according to the present invention at 46. As indicated by the results, laser treatment produces comparable reductions in the visible and near IR spectral ranges but somewhat less in the UV than is achievable with He-Oxygen plasma treatment. Both treatments exhibit lower reflectance than Z307 polyurethane black paint currently used for aerospace sensor and telescope applications.

Figure 5:
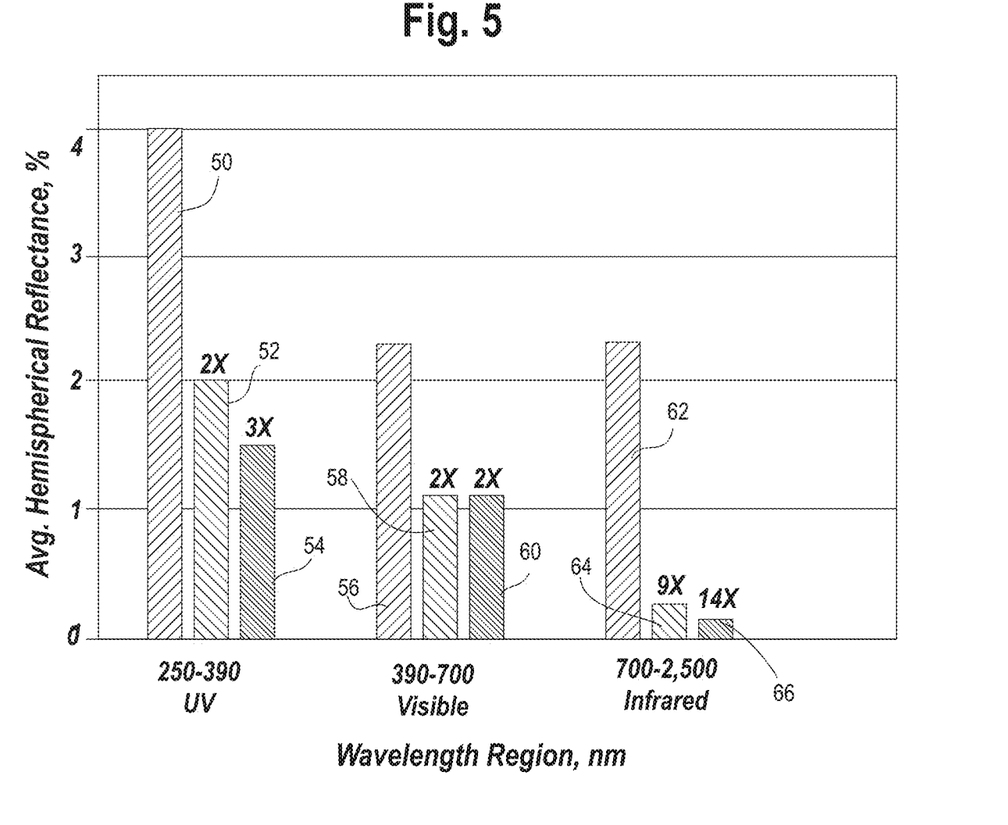
FIG. 5 is a bar graph showing the broadband reflectance properties of various optical absorbers.

More quantitative reflectance reduction comparisons are shown in FIG. 5, which depicts average hemispherical reflectance vs. wavelength for three different materials at three different wavelength ranges. For comparison purposes, a pre-treatment CNT sheet is shown at 50, 56 and 62. A CNT sheet laser treated according to the present invention is shown at 52, 58 and 64. An average 2×-3× reduction in reflectance is observed with laser treatment in the ultraviolet (UV) and visible light regions and over 9× reduction is found in the near infrared (IR) region. These are sizable reductions which have been obtained from a single laser treatment and compare favorably with the reduction in reflectance for CNTs receiving a plasma treatment, shown at 54, 60 and 66.

Figure 6A:
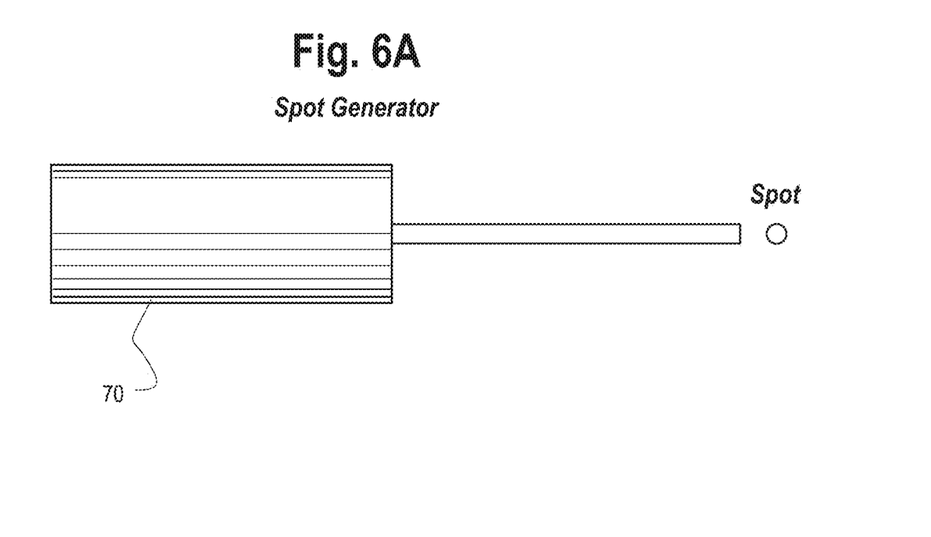
FIGS. 6A and 6B are schematics of a laser spot and line generator useful for CNT surface functionalization and/or texturing
Figure 6B:
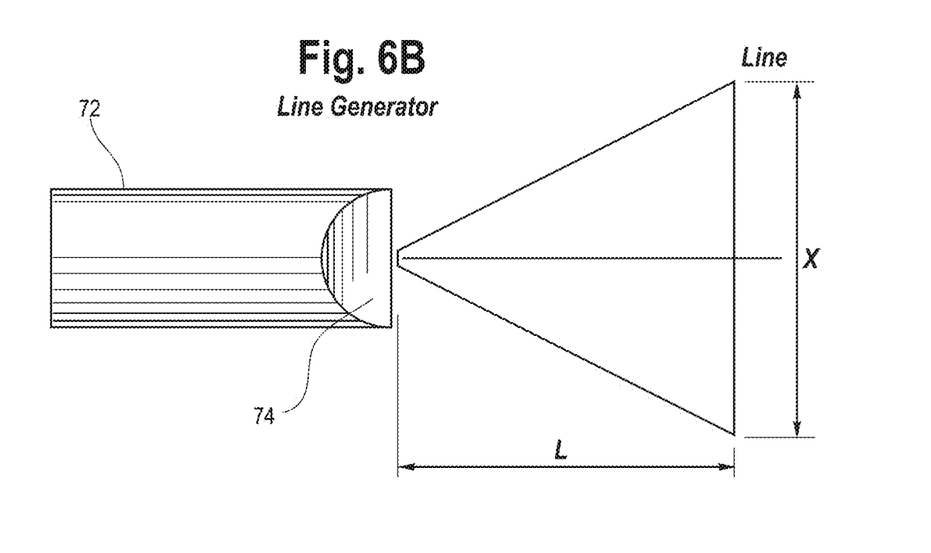

FIGS. 6A and 6B are schematics of two types of lasers that are useful for CNT surface functionalization and/or texturing. FIG. 6A shows a laser spot generator 70. FIG. 6B shows a laser line generator 72. Parameters for this laser include a length L between the laser and the work piece, and a dimension X which is the width of the line generated by laser 72 at the sheet surface.

Figure 7A:
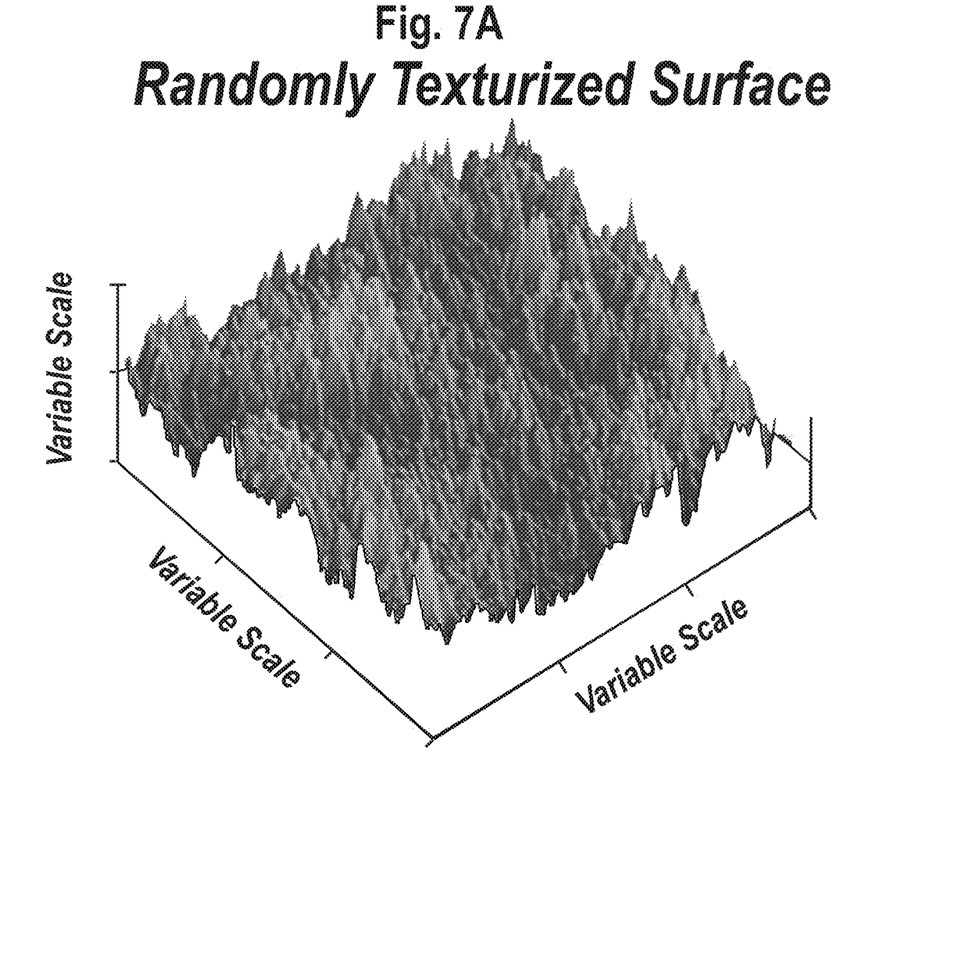
FIGS. 7A and 7B depict examples of a randomly texturized surface by a laser process according to the present invention.
Figure 7B:
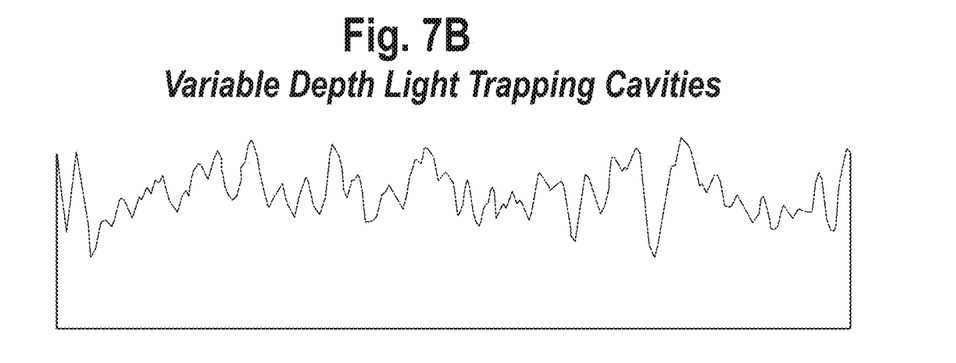

FIG. 7A shows another embodiment of the invention featuring a CNT sheet with a texturized surface. A perspective view is shown in FIG. 7A while a cross sectional view is shown in FIG. 7B. In this embodiment, the surface height of the CNT sheet is variably and randomly etched by a laser rastering method. In an example embodiment, the power of the laser is increased from 1 to 10 watts every 50 microseconds, however, the power and time intervals are representative and depend on the capability of the laser used and a preferred spacing between cavities. The rasterization creates a large number of variable depth light trapping cavities across the surface of the CNT sheet.

Figure 8:
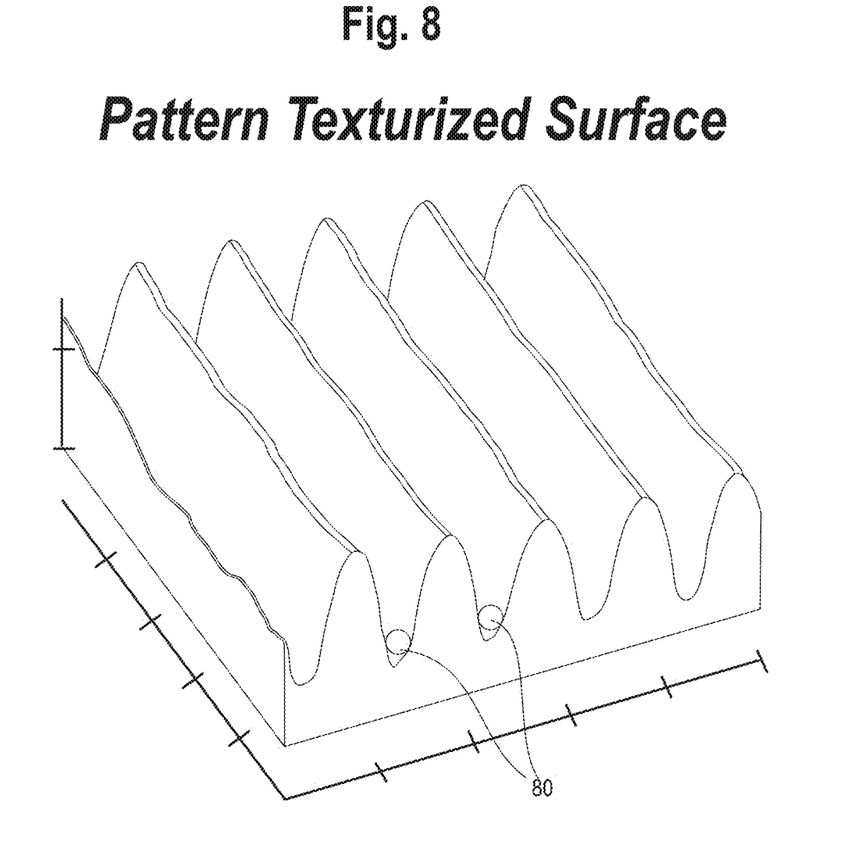
FIG. 8 is a depiction of a pattern textured surface by a laser process according to the present invention.

FIG. 8 shows a further embodiment wherein the surface of the CNT sheet has been treated in a regular pattern with a laser. Long light trapping cavities 80 are formed across the surface of the CNT sheet to provide directional reflectance properties. In an embodiment, the power of the laser is increased from approximately 1 to 10 watts approximately every 50 microseconds, although a variety of power levels and time intervals may be used, depending on the capability of the laser and a preferred spacing between cavities.

Functionalization and texturizing CNT sheet material with a laser to reduce its reflectance properties depends on several instrument factors and environmental conditions. These laser factors and environment conditions together determine how quickly the CNT sheet reaches a surface temperature that supports surface functionalizing reactions and how rapidly these reactions may be quenched through thermal radiation, conduction and convection processes to control functionalization and texturization to the desired depth. In texturizing CNT sheet surface to enhance its light trapping and absorbing properties further, the laser beam may be modulated to produce pits and valleys ranging in depth from 2 to over 1,000 times the wavelength of the laser used for treatment. These laser factors can include:

The type of laser, which may be continuous power or pulsed, gas type or solid state, for example.

Laser power, for example, approximately 1-15 watts per square centimeter.

Laser wavelength, for example, 100 nm to 11,000 nm.

Laser beam focus/size, for example, 1 micrometer to 10,000 micrometers.

Laser beam shape, for example, circular spot, star, bar or generated line type.

Laser sweep and step rate, for example, a step resolution between 50 and 2,400 dots per inch (DPI) and raster rate of between 12 and 360 inch per second.

Environmental parameters include ambient temperature and pressure, as well as composition of the environment. As explained above, CNTs will be functionalized by various oxygen groups in ambient air, but a nitrogen environment may also be used to functionalize CNTs with nitrogen species.

Further environmental parameters include sheet mechanical tension and physical mounting or vacuum hold-down. For functionalizing and texturizing CNT sheet in an ambient air environment, sheet surface temperatures of 400° C. to 500° C. are needed to initiate the process and the laser parameters and other conditions need to be adjusted to permit achievement of these temperatures and possibly higher temperatures to accelerate treatment. For treatment under other gaseous atmospheres higher or lower surface temperatures may be required. For example, the method may be performed in a nitrogen environment.

The steps or operations described herein are just for example. There may be many variations to these steps or operations without departing from the spirit of the invention. For instance, the steps may be performed in a differing order, or steps may be added, deleted, or modified.

Although example implementations of the invention have been depicted and described in detail herein, it will be apparent to those skilled in the relevant art that various modifications, additions, substitutions, and the like can be made without departing from the spirit of the invention and these are therefore considered to be within the scope of the invention as defined in the following claims.

What is claimed is:

1. A method of manufacturing an optical absorber, comprising:
    forming a stack of non-woven sheets of randomly-organized horizontally-oriented carbon nanotubes (CNTs) so that each of the sheets define a plane that is parallel to planes of the other sheets, the stack having an external exposed surface disposed to absorb light between 250-2,500 nm striking the exposed surface;
    functionalizing the exposed surface of the stack by applying variable amounts of localized heat by a scanning a laser beam across substantially all of the external surface to form a plurality of variable depth, localized, hills and valleys formed on substantially all of the exposed surface so that the depth of the valleys terminate at different sheets within the stack to form a functionalized exposed surface having 2% or less average hemispherical reflectance of the light striking the exposed surface.

2. The method of claim 1, wherein the functionalizing step further comprises the steps of:
    selecting an operating power, a raster rate, a step resolution and a focus for a laser supplying the laser beam to cause the surface of the sheet of CNTs to reach a temperature of approximately 400 to 500 degrees centigrade.

3. The method of claim 2, wherein the operating power of the laser is approximately 1 watt per square centimeter.

4. The method of claim 3, further comprising a step of:
    increasing the power of the laser to approximately 10 watts periodically to texturize the external surface of the sheets of CNTs.

5. The method of claim 1, wherein the external surface is texturized in a spatially random manner and to a random depth between 2 and 1,000 times the wavelength of the laser beam.

6. The method of claim 1, wherein the external surface is texturized in a regular geometric pattern to a depth of between 2 and 1,000 times the wavelength of the laser beam.

7. The method of claim 1, wherein the hills and valleys formed by the functionalizing step are contiguous to intercept all of the light striking the external surface.

8. The method of claim 1, wherein the stack of non-woven sheets of horizontally-oriented carbon nanotubes (CNTs) is formed by a dry process using separate dry sheets.

9. The method of claim 1, wherein the stack of non-woven sheets of horizontally-oriented carbon nanotubes (CNTs) is formed by a dry process using separate dry sheets.

10. The method of claim 1, wherein the method is performed in ambient temperature and pressure conditions.

11. The method of claim 10, wherein the external surface is functionalized to contain oxygen and hydrogen atoms in functional groups including any of organic aldehyde, ketone, carboxylate, epoxide, peroxide and hydroxyl compounds.

12. The method of claim 1, wherein the method is performed in a nitrogen environment and the external surface of the non-woven sheet of CNTs is functionalized by nitrogen species.

* * * * *

UNITED STATES PATENT AND TRADEMARK OFFICE
CERTIFICATE OF CORRECTION

| | |
|---|---|
| PATENT NO. | : 11,221,436 B2 |
| APPLICATION NO. | : 17/354124 |
| DATED | : June 22, 2021 |
| INVENTOR(S) | : John A. Starkovich et al. |

It is certified that error appears in the above-identified patent and that said Letters Patent is hereby corrected as shown below:

In the Claims

In Claim 1, Column 6, Lines 11-12, the text "heat by a scanning a laser beam" should read --heat by a scanning laser beam--.

Signed and Sealed this
Twenty-fourth Day of May, 2022

Katherine Kelly Vidal
*Director of the United States Patent and Trademark Office*